United States Patent

Maas

[11] Patent Number: 5,920,027
[45] Date of Patent: Jul. 6, 1999

[54] FIRE CONTROL SYSTEM

[75] Inventor: Abraham Johannes Maas, La Borne, Netherlands

[73] Assignee: Hollandse Signaalapparaten B.V., Hengelo, Netherlands

[21] Appl. No.: 08/894,154

[22] PCT Filed: Feb. 9, 1996

[86] PCT No.: PCT/EP96/00548

§ 371 Date: Aug. 15, 1997

§ 102(e) Date: Aug. 15, 1997

[87] PCT Pub. No.: WO96/25675

PCT Pub. Date: Aug. 22, 1996

[30] Foreign Application Priority Data

Feb. 16, 1995 [NL] Netherlands .......................... 9500285

[51] Int. Cl.$^6$ .............................. G06F 19/00; G06G 7/80
[52] U.S. Cl. ........................ 89/41.07; 235/412; 235/413; 235/416; 342/67
[58] Field of Search .................................. 235/412, 413, 235/411, 416; 89/41.06, 41.07, 41.14; 342/67

[56] References Cited

U.S. PATENT DOCUMENTS

| | | | |
|---|---|---|---|
| 4,179,696 | 12/1979 | Quesinberry et al. | 235/412 |
| 4,184,154 | 1/1980 | Albanese et al. | 342/107 |
| 4,402,251 | 9/1983 | Burke et al. | 89/41.11 |
| 4,622,554 | 11/1986 | Gellekink et al. | 342/67 |
| 4,783,744 | 11/1988 | Yueh | 701/221 |
| 4,794,235 | 12/1988 | Burke et al. | 235/412 |
| 4,975,705 | 12/1990 | Gellekink et al. | 342/52 |

FOREIGN PATENT DOCUMENTS

| | | |
|---|---|---|
| 347968 | 12/1989 | European Pat. Off. . |
| WO 81/00149 | 1/1981 | WIPO . |
| WO 94/09382 | 4/1994 | WIPO . |

*Primary Examiner*—Charles T. Jordan
*Assistant Examiner*—Christopher K. Montgomery
*Attorney, Agent, or Firm*—Oblon, Spivak, McClelland, Maier & Neustadt, P.C.

[57] ABSTRACT

A fire control system and a method for estimating periodic component of a target path. An efficient, fast-setting estimator is realized by first estimating the period and then the amplitude of the periodic component on the basis of the most recent measurements made.

28 Claims, 3 Drawing Sheets

FIRE CONTROL SYSTEM

BACKGROUND OF THE INVENTION

1. Field of the Invention

The present invention relates to a fire control system comprising at least a target sensor and computing means coupled to it, the target sensor being arranged for the detection of targets such as aircraft and for the provision of signals p(t) related to measured target positions such as measured target positions, the computing means being arranged for the computation of an estimated frequency-determining value w as well as an estimated amplitude A of a periodic component of target signals s(t) derived from the signals p(t) and associated with a target state such as estimated positions, velocities or accelerations of the target.

The invention also relates to a method of estimating a frequency-determining value w and an amplitude A of a periodic component in target signals s(t) derived from measured positions of a target such as an aircraft and associated with a target state such as estimated positions, velocities or accelerations.

In this case, the frequency-determining value w can comprise either a frequency or a period of the target signals. The target signals s(t) may comprise a linear combination of estimated or measured target positions, target velocities or target accelerations.

2. Discussion of the Background

Fire control systems and methods of this type are known. It is often necessary, for instance with a view to the calculation of the lead angle for a gun system connected to the fire control system, to be able to make a prediction of values related to the target path. These values include not only predicted target positions, but also target velocities or target accelerations. A target can be, for instance, an aircraft or a missile performing evasive manoeuvres. In such a case, as appears from actual practice, aircraft often follow a weaving path. If the period or frequency and the amplitude of the weaving path are known, it is feasible to make an accurate estimate of target states, such as target positions or target velocities, in the immediate future. In actual practice however, neither the frequency nor the amplitude of the path is known. Notwithstanding this, it is possible to proceed on the basis of an estimated frequency and amplitude.

Fast reaction is often mandatory to fire control systems. Therefore, within a short space of time and on the basis of a limited amount of information, an accurate estimate of the target path has to be obtained. The Kalman filtering techniques known in the art do by themselves not offer a satisfactory solution to this problem, since Kalman filters invariably take a certain time to settle. If the target follows a path in a weaving pattern whose frequency is continuously changing, a Kalman filter will respond too slowly and will not immediately generate an accurate new estimate of both the frequency and the amplitude for the target path. This is partly caused by the fact that a Kalman filter always lets a new estimate of both the frequency and the amplitude depend on preceding estimates of the frequency and the amplitude. However, it appears to be feasible to estimate with great precision the frequency continuously independently of the amplitude. On the basis of the estimated frequency, an accurate amplitude estimate can subsequently be made. By this method, an accurate estimation result is sooner obtained than with the application of a Kalman filter.

SUMMARY OF THE INVENTION

The fire control system according to the invention offers a solution to the problem described hereinbefore and, accordingly, it is characterized in that the computing means are arranged such that they are capable of at least substantially continuously computing the estimated frequency-determining value w and, continuously making use of the estimated frequency-determining value w, they are capable of at least substantially continuously computing the estimated amplitude A.

The method according to the invention is characterized in that the estimated frequency-determining value w is at least substantially continuously computed and, with the estimated frequency-determining value w being used continuously, the estimated amplitude A is at least substantially continuously computed.

In prediction algorithms for target paths, it is possible to obtain a higher accuracy by also making use of estimated target accelerations.

Another advantageous embodiment of the fire control system according to the invention is therefore characterized in that the target signals s(t) comprise estimated accelerations of the target.

Still another advantageous embodiment of the method according to the invention is therefore characterized in that the target signals s(t) comprise estimated acceleration signals.

A fast and effective method of checking whether the target signals s(t) exhibit a periodicity of a certain frequency $w_0$ is to filter these by means of a bandpass filter having a high gain for this frequency $w_0$ and a low gain for other frequencies. This filter preferably comprises a second-order filter which has a low attenuation factor and a resonance frequency at $w_0$, with a view to the fact that this type of filter calls for little computing time. Also filters of a higher order by means of which a steeper rolloff can be obtained are possible. As the frequency of s(t) is closer to $w_0$, the output signal of the filter will have a higher absolute value. So, by determining the absolute value of the filter output signal in relation to that of s(t), for frequencies in the vicinity of $w_0$ it can be determined whether they occur in s(t) or not. By choosing a suitable filter characteristic it is possible to increase or to reduce the selectivity. However, if for a wide frequency band it is to be checked which frequency the target signal s(t) exhibits, a single filter is insufficient, because for frequencies which are not near $w_0$ it cannot be checked with this particular filter whether they occur in s(t). This can be obviated by applying s(t) simultaneously to a plurality of filters which are sensitive to different frequencies. The periodicity of s(t) can almost immediately be determined by comparing the output signals of every filter.

Another advantageous embodiment of the fire control system according to the invention is therefore characterized in that the computing means comprise N filters $F_i$, i=1, . . . , N, where each filter $F_i$ is principally sensitive to signals of a frequency-determining value $w_i$ belonging to the filter $F_i$ and where the target signals s(t) are presented to the input of each filter $F_i$, and that the computing means are arranged for the computation of the estimated frequency-determining value w on the basis of output signals from the N filters $F_i$.

Yet another advantageous embodiment of the method according to the invention is therefore characterized in that the target signals s(t) are applied to the input of N filters $F_i$, i=1, . . . , N, where each filter $F_i$ is principally sensitive to signals of a frequency-determining value $w_i$ belonging to the filter $F_i$, and subsequently, the estimated frequency-determining value w is determined on the basis of output signals from the N filters $F_i$.

For keeping the output signals of each filter comparable it is advantageous to keep the gain of each filter for the sensitivity frequencies, i.e. resonance frequencies, belonging to each of them, identical.

A further advantageous embodiment of the fire control system according to the invention is therefore characterized in that each filter $F_i$ for a sinusoidal input signal, with a frequency-determining value $w_i$ belonging to filter $F_i$, exhibits a signal gain which is at least substantially the same.

A further advantageous embodiment of the method according to the invention is therefore characterized in that each filter $F_i$ for a sinusoidal input signal with a frequency-determining value $w_i$ belonging to filter $F_i$ exhibits a signal gain which is at least substantially the same.

In defining successive resonance frequencies of the different filters, one chooses preferably a constant ratio between successive resonance frequencies, so that a constant distance between any two successive resonance frequencies in logarithmic scale is obtained. Owing to this the distinction between any two signal shapes belonging to two successive resonance frequencies will also remain significant at comparatively high frequencies.

A further advantageous embodiment of the fire control system according to the invention is therefore characterized in that the frequency-determining values $w_i$ comprise frequencies $\omega_i$ which are at least substantially equidistant in logarithmic scale.

A further advantageous embodiment of the method according to the invention is therefore characterized in that the frequency-determining values $w_i$ comprise frequencies $\omega_i$ which are at least substantially equidistant in logarithmic scale.

For determining the frequency of the signal s(t) it is advantageous to determine an amplitude for each output signal of a filter and to determine subsequently for which filter the output amplitude is maximum. The output amplitude signals are preferably determined by capturing the absolute values of the output signals and subsequently feeding the absolute-value signals through a low-pass filter. The estimated frequency of s(t) can then be equated to the resonance frequency of this filter. The estimated frequency can be determined fast and efficiently by this method.

A further advantageous embodiment of the fire control system according to the invention is therefore characterized in that the computing means are arranged for the determination of amplitudes $A_i$ of the output signals of the filters $F_i$ and for the determination of the estimated frequency-determining value w, making use of the frequency-determining values $w_i$ and the amplitude values $A_i$.

A further advantageous embodiment of the method according to the invention is therefore characterized in that an amplitude $A_i$ of the output signals of the filters $F_i$ is determined, and that, making use of the frequency-determining values $w_i$ and the amplitude values $A_i$, the estimated frequency-determining value w is determined.

If desired, an interpolation between the amplitudes of the output signals of each filter can be performed and the estimated frequency of s(t) be equated to the frequency where the interpolation exhibits a global maximum. This results in a more accurate estimate and makes it feasible to use fewer different filters, which economizes on computing time.

A further advantageous embodiment of the fire control system according to the invention is therefore characterized in that the computing means are arranged for performing an interpolation between ordinates $A_i$, making use of the frequency-determining values $w_i$ as abscissa and the amplitudes $A_i$ as ordinate belonging to $w_i$, and that the computing means are arranged for deriving the estimated frequency-determining value w from that frequency-determining value for which the interpolation exhibits a global maximum.

A further advantageous embodiment of the method according to the invention is therefore characterized in that, making use of the frequency-determining values $w_i$ as abscissa and the amplitudes $A_i$ as ordinate belonging to $w_i$, an interpolation between the ordinates $A_i$ takes place and that the estimated frequency-determining value w is derived from that frequency-determining value for which the interpolation exhibits a global maximum.

Now a good estimate of the frequency of s(t) is known, a good estimate of the amplitude of s(t) can be obtained by making use of it. An obvious method of doing so is to adapt two sinusoidal signals, with this frequency, which are 90 degrees out of phase, to s(t), through adapting the amplitudes of these sinusoidal signals by means of a least-squares estimator. This has the drawback that values of the sinusoidal signals have to be computed continuously, which takes much computing time. It is much more advantageous to adapt amplitudes of signals having a rectangular waveform with the estimated frequency, because the computation of values of rectangular-wave signals takes little or no computing time. For adapting amplitudes of rectangular-wave signals to the target signals s(t) by means of a least-squares estimator it is necessary to have the disposal of the time integral of the target signals s(t) during the positive-going part of the rectangular wave, i.e. half a period of the rectangular wave, and during the negative-going part of the rectangular wave, also half a period of the rectangular wave. For this it is advantageous to determine sampled target signals s(t) and to adapt a sampled rectangular wave to the sampled target signals. Moreover, it is also conceivable that the target signals have been derived from signals sampled already earlier such as position signals. The above-mentioned time integral now changes to a summation. Here it is advantageous to store incrementally the target signals in a cyclic buffer memory during at least a full period of the lowest frequency which should be possible to be estimated. That means that, in case the buffer memory has been completely filled, a return to the first memory element of the buffer memory takes place. In this manner, for every sampling point in time, one has the disposal of the summation over the sampling points in time of s(t). A summation over a certain interval formed by a number of sampling points in time can now be obtained directly by subtracting the numerical value in the buffer memory at the start of the interval from the numerical value in the buffer memory at the end of the interval. The contents of the buffer memory can now be used for each computing operation requiring the target-signal values summed over the sampling points in time.

A further advantageous embodiment of the fire control system according to the invention is therefore characterized in that there is made provision for means for determining sampled target signals s(t), and that there is also made provision for a cyclic buffer memory, and that there is made provision for means for storing samples of the target signals s(t) incrementally in successive memory elements of the cyclic buffer memory.

A further advantageous embodiment of the method according to the invention is therefore characterized in that the target signals s(t) comprise a sampled signal, and that samples of the target signals s(t) are stored incrementally in successive memory elements of a cyclic buffer memory.

Now that the incremental target signal values have been stored in a buffer memory, it is advantageous to use these in determining the estimated amplitude A. This now calls for only few computing steps.

A further advantageous embodiment of the fire control system according to the invention is therefore characterized in that the computing means are arranged for determining the estimated amplitude A on the basis of values stored in the cyclic buffer memory.

A further advantageous embodiment of the method according to the invention is therefore characterized in that the estimated amplitude A is determined on the basis of values stored in the cyclic buffer memory and the estimated frequency-determining value w.

In determining the sampled signals s(t) it is advantageous to make provision for a constant sampling time, for instance, by means of a clock signal, whereas it is also conceivable that the signals s(t) are derived from position signals sampled at a constant sampling time. This simplifies the computing operations which are to be performed with the sampled signals.

A further advantageous embodiment of the fire control system according to the invention is therefore characterized in that the computing means are provided with means for assigning a certain time validity to the values stored in the cyclic buffer memory, where the difference between the time validities of successive values are at least substantially constant.

A further advantageous embodiment of the method according to the invention is therefore characterized in that the values stored in the cyclic buffer memory form an incremental target signal $g(t_i)$ and that these values have time validities at discrete points in time $t_i$ which are at least approximately equidistant.

The fire control system can even further be improved by also making provision for means for the determination of incremental target signal values between the sampling points in time. Owing to this, it is at any time possible to determine a summation of the sampled target signals.

A further advantageous embodiment of the fire control system according to the invention is therefore characterized in that the computing means are also arranged for the determination of incremental target signal values g(t) on the basis of the values $g(t_i)$ stored in the cyclic buffer memories, where t represents the time, which time can also be in between the discrete points in time $t_i$.

A further advantageous embodiment of the method according to the invention is therefore characterized in that the incremental target signal values g(t) are determined on the basis of the values $g(t_i)$ stored in the cyclic buffer memories, where t represents the time, which time can also be in between the discrete points in time $t_i$.

A method of determining the incremental target signal values in between sampling points in time is to perform a linear interpolation between any two sampling points in time, which method demands little computing capacity and is nevertheless sufficiently accurate.

A further advantageous embodiment of the fire control system according to the invention is therefore characterized in that the computing means are also arranged for the determination of the values g(t) by means of linear interpolation between the incremental target signal values $g(t_i)$ stored in the cyclic buffer memory.

A further advantageous embodiment of the method according to the invention is therefore characterized in that the values g(t) are determined by means of linear interpolation between the incremental target signal values $g(t_i)$ stored in the cyclic buffer memory.

Now there is the possibility of determining, in relation to the sample most recently introduced into the buffer memory, incremental target signals at any point back in time, it appears feasible to adapt, rapidly and substantially at any instant, a rectangular wave having a wavelength corresponding with the estimated period to the sampled target signal. In doing so, it is advantageous to adapt every time two rectangular waves which are at least approximately a quarter of a period out of phase, because phase information is also provided in this manner. A reference sample stored in the buffer memory serves as a basis for adapting the rectangular waves over a full period back in time. Of course, it is feasible to retrogress several periods, but this requires more buffer memory space and more computing time. Over the positive-going half period and over the negative-going half period, a summation of the sampled target signals per half period can be determined for each rectangular wave by subtracting a total summation at the start of a half period from a total summation at the end of this half period, whereupon for each rectangular wave the two summations can be subtracted from each other. For each rectangular wave this results in an estimated amplitude of the respective rectangular wave, where these two amplitudes can be combined into an estimated amplitude A. As the summations are already available in the buffer memory, this operation can take place swiftly.

A further advantageous embodiment of the fire control system according to the invention is therefore characterized in that the computing means are also arranged for the determination of the estimated period T and for the subsequent determination of:

$$a_1=(x_1-2x_3+x_5)/T$$

and $$a_2=(x_1-2x_2+2x_4-x_5)/T,$$

where:

$x_1$ is at least substantially equal to $k_1 g(t_r)$,
$x_2$ is at least substantially equal to $k_1 g(t_r-T/4)$,
$x_3$ is at least substantially equal to $k_1 g(t_r-T/2)$,
$x_4$ is at least substantially equal to $k_1 g(t_r-3T/4)$,
$x_5$ is at least substantially equal to $k_1 g(t_r-T)$, where $t_r$ represents the time validity of a value introduced into the cyclic buffer memory, and $k_1$ represents a scaling factor, such as the numerical value 1.

A further advantageous embodiment of the method according to the invention is therefore characterized in that the estimated period T and subsequently the values of:

$$a_1=(x_1-2x_3+x_5)/T$$

and $$a_2=(x_1-2x_2+2x_4-x_5)/T$$

are determined, where:

$x_1$ is at least substantially equal to $k_1 g(t_r)$,
$x_2$ is at least substantially equal to $k_1 g(t_r-T/4)$,
$x_3$ is at least substantially equal to $k_1 g(t_r-T/2)$,
$x_4$ is at least substantially equal to $k_1 g(t_r-3T/4)$,
$x_5$ is at least substantially equal to $k_1 g(t_r-T)$, where $t_r$ represents the time validity of a value introduced into the cyclic buffer memory, and $k_1$ represents a scaling factor, such as the numerical value 1.

Here it is advantageous to take the sample introduced most recently as a basis, because this will result in an estimate of the amplitude as recent as possible.

A further advantageous embodiment of the fire control system according to the invention is therefore characterized in that $t_r$ represents the time validity of the value introduced most recently into the cyclic buffer memory.

A further advantageous embodiment of the method according to the invention is therefore characterized in that $t_r$ represents the time validity of the value introduced most recently into the cyclic buffer memory.

In calculating the estimated amplitude A, use is preferably made of the fact that the two rectangular waves, which are shifted over a quarter of a period out of phase, are orthogonal functions so that Pythagoras' theorem can be applied to the estimated amplitudes for each rectangular wave. If desired, scaling factors can also be applied here.

A further advantageous embodiment of the fire control system according to the invention is therefore characterized in that the computing means are further arranged for equating the estimated amplitude A to $$k_2 \times \sqrt{(k_3 a_1^2 + k_3 a_2^2)},$$

where $k_2$ and $k_3$ represent scaling factors, such as the numerical value 1.

A further advantageous embodiment of the method according to the invention is therefore characterized in that the estimated amplitude A is equated to $$k_2 \times \sqrt{(k_3 a_1^2 + k_3 a_2^2)},$$

where $k_2$ and $k_3$ represent scaling factors, such as the numerical value 1.

Starting from rectangular waves it is now feasible to adapt in good approximation sinusoidal signals to the target signals by choosing the scaling factors in the right way. Should the target signals s(t) really have a pure sinusoidal form, the amplitude estimated by this method is exact.

A further advantageous embodiment of the fire control system according to the invention is therefore characterized in that $k_1 k_2 \sqrt{(k_3)}$ is at least substantially equal to $\pi/2$.

A further advantageous embodiment of the method according to the invention is therefore characterized in that $k_1 k_2 \sqrt{(k_3)}$ is at least substantially equal to $\pi/2$.

BRIEF DESCRIPTION OF THE DRAWINGS

The fire control system and the method according to the invention will now be further explained with reference to the figures, where.

DISCUSSION OF THE PREFERRED EMBODIMENTS

Figure 1:
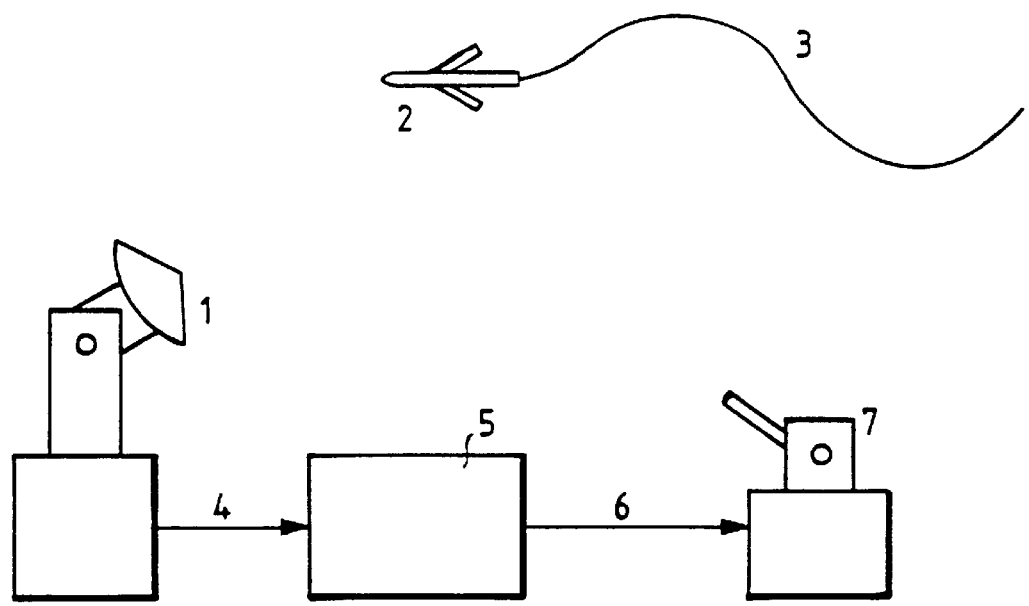
FIG. 1 represents an embodiment of the fire control system according to the invention and a weapon system attached to it.

An embodiment of the fire control system according to the invention is shown in FIG. 1. The fire control system comprises a target sensor 1 depicted here as a tracking radar, but other types of sensors such as optical sensors are also conceivable. The tracking radar is equipped for tracking a target 2 which is following a weaving path 3. The target sensor supplies target position signals 4 to a computing unit 5. It is also possible that the target sensor supplies target velocity and/or target acceleration signals to the computing unit 5. The computing unit 5 supplies azimuth and elevation signals 6 to the gun system 7 which can also comprise a missile system or any other system for destruction of the target. The computing unit 5 is arranged for estimating the frequency of a periodic component in the weaving path 3.

Figure 2:
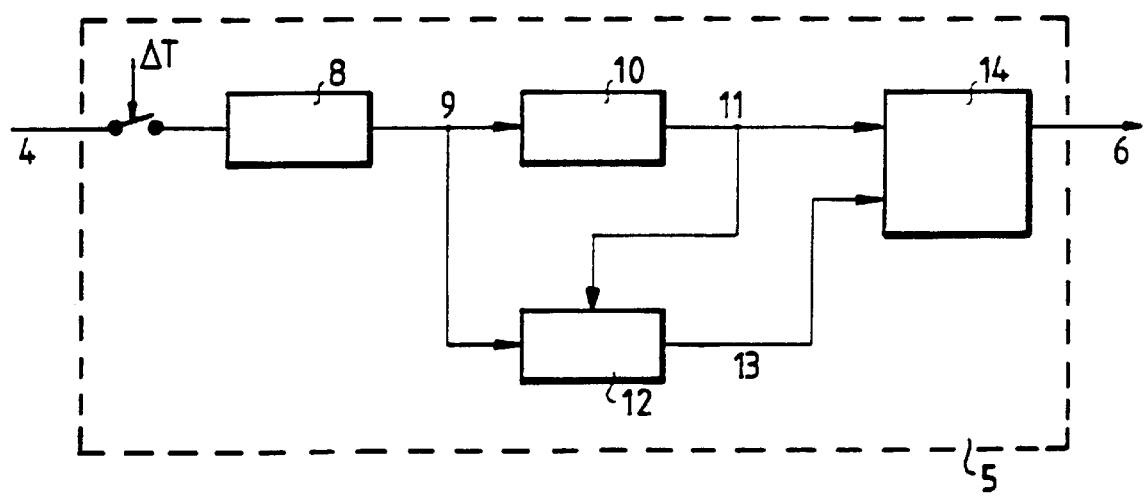
FIG. 2 represents an embodiment of a part of the fire control system in which the frequency and the amplitude of the target signals are estimated.

FIG. 2 shows an embodiment of the computing unit 5 for application in the fire control system according to the invention. The target signals 4 in this embodiment are sampled at a sampling period $\Delta T$. However, it is also conceivable that the target signals supplied have already been sampled. The sampled target signals are supplied to an estimator 8 which estimates target acceleration signals 9 on the basis of the sampled target signals. The target acceleration signals 9 are subsequently supplied to a frequency estimator 10 which determines principally continuously, but at least at every sampling point in time, a frequency of the target acceleration signals which is valid at the most recent sampling point in time. In doing so, the target course over a certain period of time in the past is taken into account. A recursive estimator or a FIR (finite-impulse response) filter can be utilized. When a FIR filter is used, signals beyond a certain period of time in the past do not influence the result of the estimation any more. In estimating the frequency it is not necessary to make use of an estimated amplitude.

The frequency estimator produces an estimated frequency and/or period 11 which is supplied to an amplitude estimator 12. This amplitude estimator 12 determines an estimated amplitude and phase 13 on the basis of the estimated target acceleration signals 9 and the estimated period 11. The estimated period 11 and the estimated amplitude and phase 13 are subsequently applied to a target-path predictor 14 which estimates a future target position on the basis hereof, with the assumption of, for instance, a sinusoidal variation of the path having an amplitude, frequency and phase in agreement with the estimated amplitude, frequency and phase. Other periodic path variations, however, are also conceivable.

On the basis of a predicted target course and other data of importance to fire control, such as the gun system position, meteorological conditions and ballistic data, azimuth and elevation values 6 for the gun system are generated.

Figure 3:
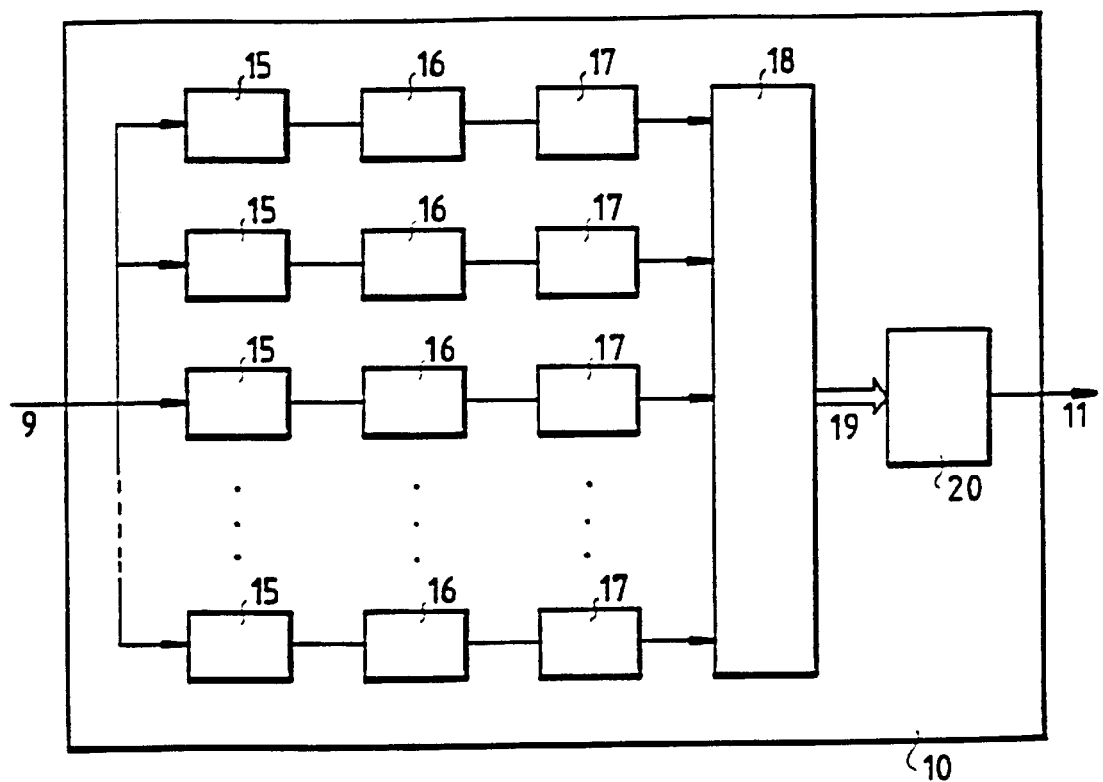
FIG. 3 is an embodiment of a part of the fire control system in which the frequency is estimated.

FIG. 3 is a representation of a possible embodiment of the frequency estimator 10. The frequency estimator 10 comprises a plurality of filters 15 operating in parallel, each filter having a fixed resonance frequency of its own. Moreover, a filter can comprise a second-order filter, but higher-order filters are also conceivable. If a high selectivity for each filter is chosen, numerous separate filters are required. With a low selectivity, few separate filters are required, but this is at the cost of a loss in accuracy of the estimator. An advantageous compromise, which results in a reasonable accuracy and does not require too many filters, is obtained by means of a number of 14 to 16 second-order filters, where the lowest resonance frequency is around 0.1 Hz and the highest resonance frequency is around 1 Hz. In absolute-value captor 16, the absolute value of the output signal from filter 15 is determined. The absolute-value signal is subsequently routed to filter 17 for smoothing the ripples arisen. If the input signal 9 exhibits a certain frequency, then the filter having a resonance frequency quite near this particular frequency will have a high absolute-value output signal. The filtered absolute-value signals are supplied to an interpolator 18 which, for each sampling point in time, continuously interpolates between the output signals of the filters, where the frequency axis serves as abscissa and the amplitude axis as ordinate. The interpolated signal 19 is subsequently supplied to block 20 where the maximum of the interpolated signal 19 and the frequency at which the maximum exists are determined. Then, the latter is the estimated frequency. The resonance frequencies of the filters 15 are preferably equidistant in logarithmic scale.

In another possible embodiment, the filters 15 comprise correlators with a sinusoidal signal. Here, the absolute-value captors 16 and the filters 17 can be omitted. As correlation takes place for each filter 15 with sinusoidal signals of fixed frequency $\omega_i$, the values of these sinusoidal signals at the sampling points in time can be stored in an array in advance, which saves computing time. The filters 15 thus supply correlation values to interpolator 18.

In a further advantageous embodiment the filters 15 comprise recursive least-squares estimators, where for each filter the amplitude and phase of a sinusoidal signal are adapted to the target signal by means of a fixed frequency for each filter. The recursive least-squares estimators preferably comprise a minimizer for the time integral of the square of residue $res_i$, where $$res_i(t) = s(t) - b_1 \sin(\omega_i t) - b_2 \sin(\omega_i t) - b_3$$

to the parameters $b_1$, $b_2$ and $b_3$. Here, $\omega_i$ is a fixed frequency for an individual filter. In the minimizer use is preferably made of an exponential forget function. For each filter, the exponential forget function has a time constant which is preferably substantially equal to the reciprocal, that is the period, of the fixed frequency of the respective filter. By means of the residues $res_i$, $i=1, \ldots, N$ and the frequencies $\omega_i$, $i=1, \ldots, N$ it is possible to determine quality factors, for instance:

$$Q_i(t) = \sqrt{\frac{b_1^2 + b_2^2}{\overline{res_i^2}}}$$

which quality factors are directly applied to interpolator 18. Here is $\overline{res_i}^2$ the estimation residue belonging to filter 15 averaged over a certain elapsed period of time. This is preferably in the order of $1/\omega_i$. If now the frequency of the target signals is around $\omega_i$, then the respective filter will produce the highest quality factor. Now, too, absolute-value captors 16 and filters 17 can be omitted.

Figure 4:
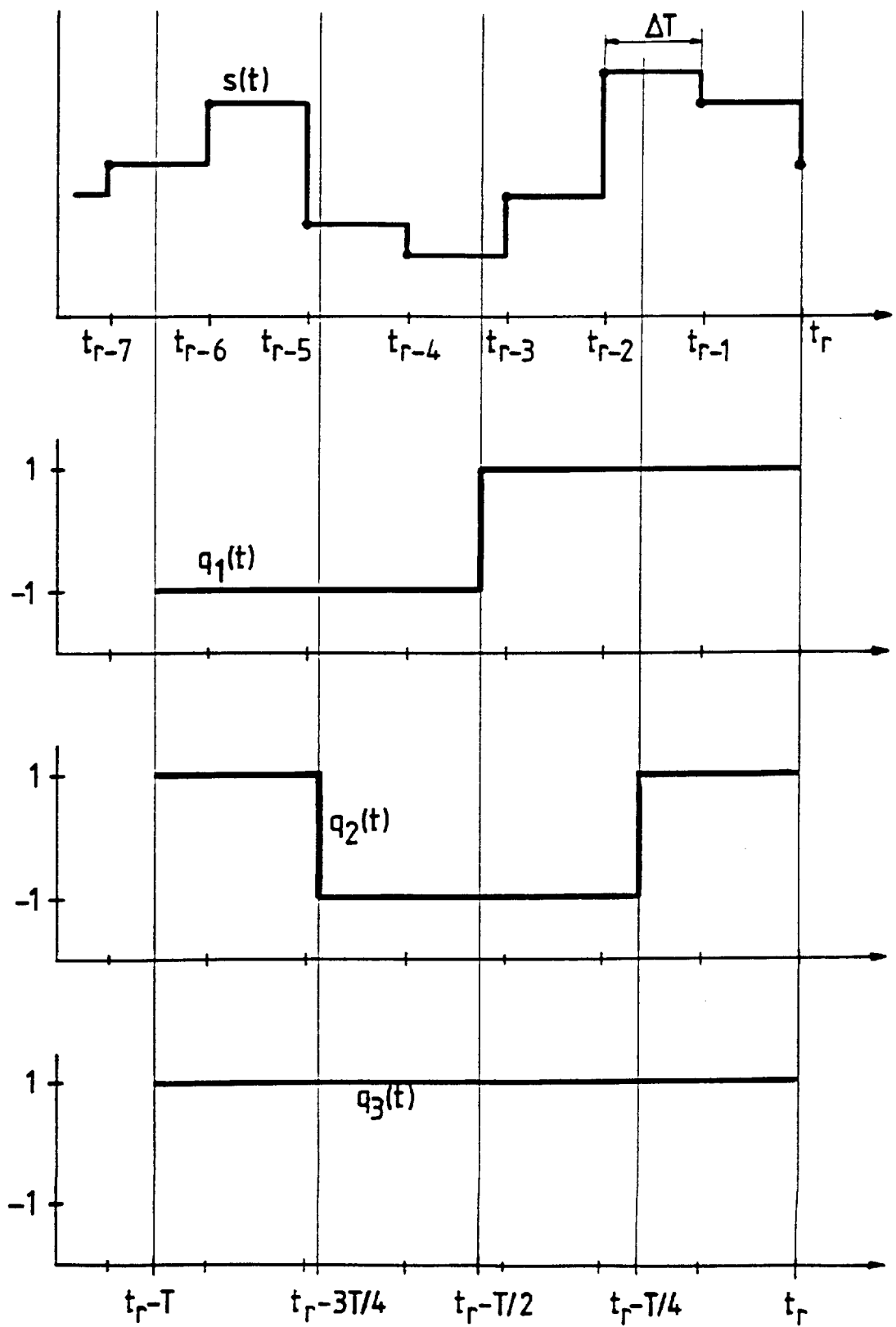
FIG. 4 is a graphic representation of sampled target signals and the rectangular waves to be adapted to them.

FIG. 4 shows in four graphs with the same time axis how two rectangular waves and an offset can be adapted to the signal s(t). The signal s(t) has been sampled at a period $\Delta T$. The graph in the top position shows the sampled signal s(t), where s(t) between the sampling points in time $t_k$ is kept constant through a zero-order hold circuit. The three lower graphs represent the rectangular-waveform signals $q_1(t)$ and $q_2(t)$ and an offset $q_3(t)$. The rectangular waves are adapted starting from the sampling point in time $t_r$, preferably equal to the most recent sample, over a period T of the rectangular waves back in time. The period T is not necessarily equal to a whole multiple of the sampling time $\Delta T$ as is indicated by the thin vertical leader lines intersecting the four graphs. The amplitudes $a_1$ and $a_2$ of the rectangular waves and the offset value $a_3$ are adapted on account of the least-squares criterion.

In general, a parameterized signal q(t) having parameters $a_1$, $a_2$ and $a_3$ can be adapted to a signal s(t) by minimizing a least-squares criterion to $a_1$, $a_2$ and $a_3$. This is used in the fire control system according to the invention. In an embodiment according to the invention, q(t) is comprised of the sum of three parameterized signals, as follows:

$$q(t) = a_1 q_1(t) + a_2 q_2(t) + a_3 q_3(t).$$

The signals $q_1(t)$ and $q_2(t)$ have a periodic rectangular waveform at an amplitude equal to 1 and a period equal to the earlier estimated period T, as indicated in FIG. 4. The signals $q_1(t)$ and $q_2(t)$ are substantially a quarter period out of phase. The signal $q_3(t)$ is constant with time and is invariably equal to 1. The parameters $a_1$ and $a_2$ determined through minimization of the least-squares criterion are a measure for the amplitude of s(t) and the parameter $a_3$ is a measure for the offset of s(t) in relation to a reference. In an embodiment according to the invention, from a certain point in time $t_r$, which is preferably equal to a time validity of a sample of s(t), the signal q(t) is adapted to the signal s(t) over one full period back in time. If desired, retrogression over more than one full period T is practicable. As more periods back in time are taken into consideration, a stronger dampening effect of the amplitude estimator will be obtained.

An additional advantage of the outlined method of amplitude estimation is that the dampening effect is thus made dependent of the estimated period T, because with a smaller period T the retrogression is less far in time than with a larger period T. For a smaller period T implies a rapid variation in the target path. With a rapid variation, rapid updating of the amplitude estimator is also desirable, which is realized by means of the method described.

It can be demonstrated that the least-squares criterion:

$$J = \int_{t_r - T}^{t_r} (s(t) - q(t))^2 \, dt$$

is minimized by supposing:

$$a_1 = (1/T) \int_{t_r - T}^{t_r} s(t) q_1(t) \, dt \quad (1)$$

$$a_2 = (1/T) \int_{t_r - T}^{t_r} s(t) q_2(t) \, dt \quad (2)$$

$$a_3 = (1/T) \int_{t_r - T}^{t_r} s(t) q_3(t) \, dt \quad (3)$$

So, the parameters $a_1$, $a_2$ and $a_3$ are obtained by solving the above integrals. Here it is convenient to make use of the fact that the signals $q_n(t)$, $n=1, \ldots, 3$ can only assume the values 1 or $-1$.

Accordingly, it is possible to utilize a signal:

$$g(t_k) = \int_{t_0}^{t_k} s(t) \, dt = \Delta T \, Z(t_k)$$

where $$Z(t_k) = \sum_{i=0}^{k-1} s(t_i)$$

Moreover, $t_0$ is a certain fixed starting point in time and $t_k$ is a certain end point in time. As $s(t_i)$ has been sampled and is subsequently held by a zero-order hold circuit, it is possible to make use of the trapezoid formula, but higher-order integration algorithms are also conceivable. $Z(t_k)$ can be stored in an array of memory elements, for $k=0, 1, 2, \ldots$, and recursively be calculated, because:

$$Z(t_{k+1}) = Z(t_k) + s(t_k).$$

In this manner, $s(t_k)$ is incrementally stored in the array of memory elements. Values of g(t), for which t is in between the discrete sampling points in time ($t_k$) and ($t_{k+1}$), can be computed by means of linear interpolation between these sampling points in time. It is also possible to equate g(t) to the value $g(t_k)$ which is nearest in time, though this is less accurate.

The integrals in (1), (2) and (3) can now be split into subintegrals over parts where $q_n(t)=1$ and parts where $q_n(t)=-1$. The subintegrals can now be determined by making use of the signals g(t) calculated preferably by interpolation, wherein for t the boundaries per subintegral are inserted. Thus, we obtain:

$$a_1=(1/T)(g(t_r)-2g(t_r-T/2)+g(t_r-T))$$

$$a_2=(1/T)(g(t_r)-2g(t_r-T/4)+2g(t_r-3T/4)-g(t_r-T))$$

$$a_3=(1/T)(g(t_r)-g(t_r-T))$$

From this it appears that the values $Z(t_k)$ over a little more than one period T back in time with respect to $t_r$ need be stored in the array of memory elements. So, use can be made of a cyclic buffer memory. If the buffer memory has been filled completely, a return to the first buffer element takes place, so that previous values of $Z(t_k)$ situated farther than one period T back in time are overwritten. In defining the number of elements in the buffer memory, the longest period T for which it should be feasible to estimate the amplitude must be taken into account.

The described method has for its advantage that only a few additions and multiplications are required, which is beneficial to the speed. If it is desired to adapt a sinusoidal signal, the amplitude estimation calls for calculations of sine values at the sampling points in time, which takes much more time than the method described.

I claim:

1. A fire control system comprising:

a target sensor; and computing means coupled to the target sensor, the target sensor being arranged for detection of a target and for preparing signals p(t) related to measured target positions, the computing means being for computing an estimated frequency-determining value w as well as an estimated amplitude A of a periodic component of target signals s(t) derived from the signals p(t) and associated with a target state of the target, wherein the computing means includes means for at least substantially continuously computing the estimated frequency-determining value w and, always making use of the estimated frequency-determining value w, when computing the estimated amplitude A, wherein the computing means comprise N filters $F_i$, i=1, . . . , N, where each filter $F_i$ is principally sensitive to signals of a frequency-determining value $w_i$ belonging to the filter $F_i$ and where the target signals s(t) are presented to the input of each filter $F_i$, and that the computing means are arranged for the computation of the estimated frequency-determining value w on the basis of output signals from the N filters $F_i$.

2. A fire control system according to claim 1, wherein all filters $F_i$ for a sinusoidal input signal with a frequency-determining value $w_i$ belonging to filter $F_i$ exhibit a substantially same gain.

3. A fire control system according to claim 1, characterized in that the frequency-determining values $w_i$ comprise frequencies $\omega_i$ which are at least substantially equidistant in logarithmic scale.

4. A fire control system according to claim 1, characterized in that the computing means are arranged for the determination of amplitudes $A_i$ of the output signals of the filters $F_i$ and for the determination of the estimated frequency-determining value w, making use of the frequency-determining values $w_i$ and the amplitude values $A_i$.

5. A fire control system according to claim 4, characterized in that the computing means are arranged for performing an interpolation between ordinates $A_i$, making use of the frequency-determining values $w_i$ as abscissas and the amplitudes $A_i$ as ordinates belonging to $w_i$, and that the computing means are arranged for deriving the estimated frequency-determining value w from that frequency-determining value for which the interpolation exhibits a global maximum.

6. A fire control system according to claim 1 further comprising:

means for determining sampled target signals s(t), a cyclic buffer memory, and means for storing samples of the target signals s(t) incrementally in successive memory elements of the cyclic buffer memory.

7. A fire control system according to claim 6, characterized in that the computing means are arranged for determining the estimated amplitude A on the basis of values stored in the cyclic buffer memory.

8. A fire control system according to claim 7, characterized in that the computing means are provided with means for assigning a time validity to the values stored in the cyclic buffer memory, where the difference between the time validities of successive values are at least substantially constant.

9. A fire control system according to claim 8, wherein the computing means includes means for determining incremental target signal values g(t) based on discrete $g(t_i)$ values stored in the cyclic buffer memories, where t represents time, which time can also be in between discrete points in time $t_i$.

10. A fire control system according to claim 9, wherein the computing means includes means for determining the g(t) incremental target signal values by linear interpolation between the incremental target signal values $g(t_i)$ stored in the cyclic buffer memory.

11. A fire control system according to claim 9, wherein the computing means includes means for determining an estimated period T and for subsequently determining $$a_1=(x_1-2x_3+x_5)/T$$

and $$a_2=(x_1-2x_2+2x_4-x_5)/T,$$

where, $x_1$ is at least substantially equal to $k_1g(t_r)$, $x_2$ is at least substantially equal to $k_1g(t_r-T/4)$, $x_3$ is at least substantially equal to $k_1g(t_r-T/2)$, $x_4$ is at least substantially equal to $k_1g(t_r-3T/4)$, $x_5$ is at least substantially equal to $k_1g(t_r-T)$, where $t_r$ represents a time validity of a value introduced into the cyclic buffer memory, and $k_1$ represents a scaling factor.

12. A fire control system according to claim 11, characterized in that $t_r$ represents the time validity of the value introduced most recently into the cyclic buffer memory.

13. A fire control system according to claim 11, wherein the computing means includes means for equating the estimated amplitude A to $k_2 x \sqrt{(k_3 a_1^2 + k_3 a_2^2)}$, where $k_2$ and $k_3$ represent scaling factors.

14. A fire control system according to claim 13, characterized in that $k_1 k_2 \sqrt{(k_3)}$ is at least substantially equal to $\pi/2$.

15. A method of estimating a frequency-determining value w and an amplitude A of a periodic component in target signals s(t) derived from measured positions of a target and associated with a target state, characterized in that the estimated frequency-determining value w is at least substantially continuously computed and, with the estimated frequency-determining value w always being used, the estimated amplitude A is at least substantially continuously computed, wherein the target signals s(t) comprise estimated acceleration signals, and the target signals s(t) are applied to the input of N filters $F_i$, i=1, ..., N, where each filter $F_i$ is principally sensitive to signals of a frequency-determining value $w_i$ belonging to the filter $F_i$, and subsequently, the estimated frequency-determining value w is determined on the basis of output signals from the N filters $F_1$.

16. A method according to claim 15, wherein all of the filters $F_i$ for a sinusoidal input signal with a frequency-determining value $w_i$ belonging to filter $F_i$ exhibit substantially equal signal gains.

17. A method according to claim 15 or 16, characterized in that the frequency-determining values $w_i$ comprise frequencies $\omega_i$ which are at least substantially equidistant in logarithmic scale.

18. A method according to claim 15, characterized in that an amplitude $A_i$ of the output signals of the filters $F_i$ is determined, and that, making use of the frequency-determining values $w_i$ and the amplitude values $A_i$, the estimated frequency-determining value w is determined.

19. A method according to claim 18, characterized in that, making use of the frequency-determining values $w_i$ as abscissa and the amplitudes $A_i$ as ordinates belonging to $w_i$, an interpolation between the ordinates $A_i$ takes place and that the estimated frequency-determining value w is derived from that frequency-determining value for which the interpolation exhibits a global maximum.

20. A method according to claim 15, characterized in that the target signals s(t) comprise a sampled signal, and that samples of the target signals s(t) are stored incrementally in successive memory elements of a cyclic buffer memory.

21. A method according to claim 20, characterized in that the estimated amplitude A is determined on the basis of values stored in the cyclic buffer memory and the estimated frequency-determining value w.

22. A method according to claim 21, wherein the values stored in the cyclic buffer memory form a first incremental target signal $g(t_i)$ and have time validities at discrete points in time $t_i$ which are at least approximately equidistant.

23. A method according to claim 22, wherein second incremental target signal values g(t) are determined using the first incremental target signal values $g(t_i)$ stored in the cyclic buffer memories, where t represents the time, which time can also be in between the discrete points in time $t_i$.

24. A method according to claim 23, characterized in that the values g(t) are determined by means of linear interpolation between the incremental target signal values $g(t_i)$ stored in the cyclic buffer memory.

25. A method according to claim 23, wherein an estimated period T is determined and followed by determining values of $$a_1 = (x_1 - 2x_3 + x_5)/T$$

and $$a_2 = (x_1 - 2x_2 + 2x_4 - x_5)/T,$$

where:

$x_1$ is at least substantially equal to $k_1 g(t_r)$, $x_2$ is at least substantially equal to $k_1 g(t_r - T/4)$, $x_3$ is at least substantially equal to $k_1 g(t_r - T/2)$, $x_4$ is at least substantially equal to $k_1 g(t_r - 3T/4)$, $x_5$ is at least substantially equal to $k_1 g(t_r - T)$, where $t_1$ represents the time validity of a value introduced into the cyclic buffer memory, and $k_1$ represents a scaling factor.

26. A method according to claim 25, characterized in that $t_r$ represents the time validity of the value introduced most recently into the cyclic buffer memory.

27. A method according to claim 25, characterized in that the estimated amplitude A is equated to $k_2 \times \sqrt{(k_3 a_1^2 + k_3 a_2^2)}$, where $k_2$ and $k_3$ represent scaling factors.

28. A method according to claim 27, characterized in that $k_1 k_2 \sqrt{(k_3)}$ is at least substantially equal to $\pi/2$.

* * * * *